3,462,513
WIRE ENAMELS CONTAINING POLYVINYL ACETAL, PHENOLFORMALDEHYDE CONDENSATE, BLOCKED POLYISOCYANATE, MELAMINE-ALDEHYDE RESIN AND A POLYSILOXANE RESIN
Andrew F. Fitzhugh, Wilbraham, Charles F. Hunt, Springfield, and Edward Lavin, Longmeadow, Mass., assignors to Monsanto Company, St. Louis, Mo., a corporation of Delaware
No Drawing. Filed Feb. 1, 1966, Ser. No. 523,894
Int. Cl. C08f 29/32; C08g 37/18
U.S. Cl. 260—826
10 Claims

ABSTRACT OF THE DISCLOSURE

Wire enamel compositions are prepared from 100 pts., poly vinyl acetal, 40–70 parts phenol formaldehyde condensate, 2–15 parts of a blocked polyisocyanate, 2–15 parts of a polysiloxane and 2–15 parts of a melamine formaldehyde resin. In an example, 100 parts of polyvinyl formal was mixed with 58 pts. phenol formaldehyde resin, 9 pts. of a blocked isocyanate prepared from the reaction of trimethylol propane with toluene diisocyanate, 8 pts. of melamine resin and 5.5 pts. of phenylhexylmethoxy polysiloxane.

---

This invention relates to improved poly(vinyl acetal) wire enamel formulations. More particularly, it relates to wire enamels based on poly(vinyl acetal) which have improved burnout resistance.

Electric motors, especially those found in portable electric hand tools such as saws, drills, sanders, etc., when overloaded, undergo a drastic temperature rise which causes a breakdown of the insulation on the wire windings in the motor and a subsequent burnout of the motor. A definite need exists for an improved poly(vinyl acetal) wire enamel which will withstand the extreme temperatures caused by overloaded electric motors and thereby resist burnout.

An object of this invention is to provide wire enamels with improved properties.

Another object of this invention is to provide wire enamels with improved burnout conditions even at temperatures up to 400° C.

These and other objects are obtained by an improved wire enamel composition comprising (A) poly(vinyl formal) (B) from about 40 to about 70 parts of a phenol/formaldehyde condensate (C) from about 2 to 15 parts of polyurethane (D) from about 2 to 15 parts of a melamine resin and (E) from about 2 to 15 parts of a silicon containing material selected from the group consisting of silanes and polysiloxanes having the general formula:

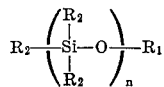

wherein $R_1$ is hydrogen, alkyl of from 1 to 4 carbon atoms, aryl of from 6 to 10 carbon atoms; $R_2$ is independently selected from the group consisting of hydroxyl, alkyl of from 2–10 carbon atoms, alkoxy of from 1 to 4 carbon atoms, and aryl of from 6 to 10 carbon atoms; $n$ is an integer of from one to 30; and wherein the parts given are parts by weight per hundred parts by weight of poly(vinyl formal).

The following examples are given in illustration of the invention and are not to be construed as limitations thereof. All parts and percentages are by weight unless otherwise indicated.

EXAMPLE I

A. Enamel preparation and coating of wire

This example uses a standard formulation of poly(vinyl formal) and phenolic resins and is set forth as a control to illustrate the lower burnout resistance that results when one does not use the improved wire enamels of this invention.

10.65 parts of a poly(vinyl formal) resin (Formvar 15/95) and 5.33 parts of a phenolic resin are dissolved in 25.20 parts of "cresylic acid" and 58.80 parts of naphtha. "Cresylic acid" is a term well known to those skilled in the art, which is used for a mixture of various cresols and xylenols in various proportions. The phenolic resin, which is the condensation product of cresol and formaldehyde, is prepared according to the procedure outlined in U.S. Patent 2,307,588. This solution is used to coat #18 copper wire according to the following procedure. The copper wire is passed through the solution, the excess solution wiped off by passing through a circular die, and then a vertical oven 12 feet in length, at a speed of 16 feet per minute. wherein the temperature is graduated from 80° C. to 100° C. at the bottom to 350° C. to 400° C. at the top. The solvent is driven off and the resin coating cured. The dipping-curing cycle was repeated six times and a resin coating 0.0016 inch in thickness is built up.

B. Burnout resistance test

Two 12-inch strands of the coated wire are twisted together into a single strand with a bifurcation at each end. A 110 volt potential is maintained continuously between the two wires of the twisted strand at varying currents (amperes) for continuous periods and at cycles of 20 seconds on and 10 seconds off, with the following results:

Continuous test

| Current (amperes): | Minutes to failure |
|---|---|
| 35 | 6.2 |
| 36 | 2.9 |
| 37 | 1.2 |
| 38 | 1.0 |

Cycling test

| Current (amperes): | Cycles to failure |
|---|---|
| 38 | 12 |
| 39 | 5 |
| 40 | 3 |

EXAMPLE II

This example is set forth in order to illustrate the improved burnout resistance that is achieved when one prepares a wire enamel in accordance with the teaching of this invention. The following ingredients are charged to a two-liter flask equipped with stirring means:

| Resins (solids content): | Parts |
|---|---|
| Polyvinyl formal (Formvar 15/95 E) | 100 |
| Phenolic resin | 58 |
| Poly urethane resin | 8 |
| Melamine resin | 8 |
| Phenylhexylmethoxy polysiloxane | 5.5 |
| Solvents: | |
| Cresylic acid | 300 |
| High-flash aromatic naphtha | 450 |
| Total | 929.5 |

The resulting solution has a solids content of about 19% and a Brookfield viscosity of about 50 poises when measured at 25° C.

The poly(vinyl formal) used has a weight-average molecular weight of about 32,000, a hydroxyl content as poly(vinyl alcohol) of about 5.5% and residual acetate content as poly(vinyl acetate) of about 11%. This material has a Brookfield viscosity of about 41 poises, which is measured using a 15% solution in 60:40 toluene/ethanol at 25° C. The poly(vinyl formal) and phenolic resin of this example are the same as those used in Example I.

The melamine resin used is a butylated melamine formaldehyde resin containing para-toluene sulfonamide dissolved in xylol at 60% solids, which is prepared according to the procedure set forth in Example IV of U.S. Patent 2,508,876.

The phenol-blocked urethane is the reaction product of three mols of 2,4 tolylenediisocyanate and one mol of trimethylolpropane wherein the free isocyanate groups are blocked with phenol.

The polysiloxane resin has the general formula:

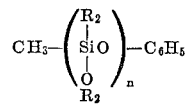

wherein $R_2$ is about a 75/25 mol percent mixture of phenyl/hexyl radicals and $n$ is an average of 10.

This solution is used to coat #18 copper wire 20 according to the procedure of Example I. The coated wire is then tested for burnout resistance according to the procedure of Example I with the following results:

Continuous test

| Current (amperes): | Minutes to failure |
|---|---|
| 35 | 180 |
| 36 | 51 |
| 37 | 2.8 |
| 38 | 1.5 |

Cyclic test

| Current (amperes): | Cycles to failure |
|---|---|
| 38 | 260 |
| 39 | 120 |
| 40 | 9 |

A comparison of the burnout resistance test data of Examples I-II clearly indicates that when using the improved formulations of this invention, as is illustrated by Example II, one may achieve burnout resistance that far exceeds that obtained using the classical formulation of Example I.

The following Examples III to VII are set forth to illustrate the range in proportions and the variations in resins that one might use in the practice of this invention.

EXAMPLE III

A wire enamel having the following composition is prepared according to the procedure of Example II

| | Parts |
|---|---|
| Polyvinyl formal | 100 |
| Phenolic resin | 45 |
| Polyurethane | 8 |
| Melamine resin | 7 |
| Polysiloxane | 6 |

The ingredients used in this example are the same as those used in Example II except that the phenolic resin used here is a condensate of formaldehyde with a phenolic material, which is made up of about 55% meta-cresol, 30% para-cresol with the balance being lower boiling xylenols. The resulting condensate has a degree of polymerization of about 10.

This solution is coated onto #18 copper wire and tested for burnout resistance, according to the procedures of Example I. The test specimens go an average of 66 cycles at 39 amperes before failing. This value is significantly higher than the 5-cycle average for the control formulation in Example I.

EXAMPLE IV

Example III is repeated here except that 65 parts of the phenolic resin are used. This composition gives a wire enamel that lasts for an average of 102 cycles in the 39 ampere burnout resistance test.

EXAMPLE V

Example II is repeated here only substituting 12 parts of a cyclic trimer of tolylene diisocyanate which is blocked with cresol for the polyurethane used in Example II. Number 18 copper wire coated with this solution lasted an average of 81 cycles at 39 amperes before burnout as compared to the 5-cycle average for the control formulation in Example I.

EXAMPLE VI

Example II is repeated here only substituting 7 parts of a silane of the general formula:

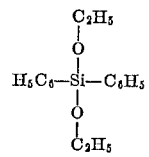

for the polysiloxane in Example II.

The wire coated with this solution lasted an average of 37 cycles at 39 amperes before burnout compared to the 5 cycles obtained with the solution of Example I.

EXAMPLE VII

Example II is repeated here, except that 5 parts of a melamine/formaldehyde resin which is the condensation product of hexamethoxymethylmelamine is substituted for the melamine used in Example II. The burnout resistance tests on copper wire coated with this enamel averages 63 cycles at 39 amperes.

EXAMPLE VIII

Example VI is repeated here except that 12 parts of the melamine resin is used instead of the 5 parts used in Example VI with equally good results.

The poly(vinyl acetals) useful in this invention are obtained by reacting poly(vinyl alcohol) or a partially hydrolyzed poly(vinyl ester) with an aldehyde, especially formaldehyde. Poly(vinyl acetals) contain hydroxyl groups and may contain a certain number of ester groups depending upon the extent of the hydrolysis and the acetalization reactions. The preferred poly(vinyl formal) resins contain on a weight basis, 8–16% ester groups calculated as poly(vinyl ester), 3–15% hydroxyl groups calculated as poly(vinyl alcohol) and the balance substantially formaldehyde acetal. These materials should have a weight average molecular weight in the 5,000 to 100,000 molecular weight range with a range of from 10,000–50,000 being preferred. In the commercial poly(vinyl formals), the ester groups are acetate groups. Other poly(vinyl acetals) such as the reaction product of hydrolyzed poly(vinyl esters) with acetaldehyde, propionaldehyde, butyraldehyde and benzaldehyde may also be used in the practice of this invention.

The phenol-aldehyde resins which are useful in the present invention can be limited to those soluble in the solvent systems employed for the preparation of wire enamels. Such can be readily selected from the general class of heat curable phenol-aldehyde resins. The phenolic portion of the resin, in addition to the meta-para-cresol used in most of the above examples, may also be selected from the group consisting of phenol, xylenol, mixtures of xylenols and cresols, wood-oil phenolic bodies, and others. The aldehyde portion of the resin in addition to the formaldehyde used in the examples may also be acetaldehyde propionaldehyde, butyraldehyde or other suitable aldehydes. The preferred composition of phenol-aldehyde resin useful for wire enamels is obtained by reacting 1 mol of a phenol such as meta-para-cresol with 0.1–2.0 mols of formaldehyde.

One may use from 40 to 70 parts of the phenolic resin in the practice of this invention. Preferably one would use from 50 to 60 parts with 54 to 58 parts as the optimum amount.

The melamine-aldehyde resins which can be used in the present wire enamel compositions can be selected from the general class of resinous aldehyde condensation products of melamine which are soluble in the organic liquids employed as solvents for the resinous components of the enamel. The aldehyde condensation products are well known and may be formed by reacting from 1–6 mols of the aldehyde with 1 mol of melamine. The solubility of the melamine-aldehyde condensation product is generally obtained by further reacting the condensation product with an alcohol or by co-condensing the melamine and aldehyde in the presence of an alcohol.

The aldehydes which may be used are aliphatic, aromatic, cyclic and heterocyclic aldehydes, including formaldehyde, acetaldehyde, propionaldehyde, butyraldehyde, isobutyraldehyde, valeraldehyde, octaldehyde, benzaldehyde, cinnamaldehyde, furfural, etc.

The alcohols which may be used include aliphatic, cyclo-aliphatic, aromatic, nitro, and amino alcohols such as methanol, ethanol, propanol, isopropanol, butanol, isobutanol, pentols, octanols, lauryl alcohol, cetyl alcohol, stearyl alcohol, cyclohexanol, benzyl alcohol, cinnamyl alcohol, allyl alcohol, 2-nitro-1-butanol, 2-nitro-2-methyl-1-propanol, 2-nitro-2-methyl-1,3-propane diol, 2-nitro-2-ethyl-1,3-propane diol, tris (hydroxy methyl) nitro methane, 2-amino-1-butanol, 2-amino-2-methyl-1-propanol, 2-amino-2-methyl-1,3 propane diol, 2-amino-2-ethyl-1,3-propane diol, tris (hydroxy methyl) amino methane, etc. Mixtures of two or more alcohols may be used if desired. The amounts of the alcohol reacted are generally equal to or in excess of the aldehyde on a molar ratio.

The preferred melamine-aldehyde resins are the further reaction products of the melamine, aldehyde and alcohol reactants with an aryl sulfonamide.

These products are also well known and may be obtained by co-condensation of all the reactants named such as taught in U.S. Patent 2,508,876. The useful aryl sulfonamides include benzene sulfonamide and the ring-substituted derivatives thereof, such as toluene-sulfonamide, chlorobenzene sulfonamide, nitro-benzene sulfonamides, etc.

For reasons of economy and availability, it is preferred to use the co-condensation products of melamine, toluene-sulfonamide, formaldehyde and butanol. The proportions of reactants may be varied between the limits of 1 mol of melamine to from 0.1 to 1.0 mol of toluene-sulfonamide and from 1–6 or mole mols of formaldehyde. An excess of the aldehyde may be used. The toluene-sulforamides may be any of the isomeric ortho-, metal- or para-derivatives, or it may be a mixture of two or more of the isomers.

One may use from 2 to 15 parts of the melamine-aldehyde resin in the practice of this invention. Preferably one would use from 6 to 9 parts with 8 parts being the optimum amount.

The polyurethane materials of this invention are adducts of organic polyisocyanates in which isocyanate groups are "blocked" by reaction with the reactive hydrogen of another organic compound. The adduct portion of the polyurethane is removed by the elevated temperatures of the cure reaction, permitting the remaining polyisocyanate thus produced to cross-link the resinous composition. Suitable polyisocyanates include compounds such as phenylene diisocyanates, diphenylene diisocyanates, tolylene diisocyanates, naphthylene diisocyanates, diphenylmethane diisocyanates, cyclohexane diisocyanates, ethylene diisocyanates, tetramethylene diisocyanates, hexamethylene diisocyanates, polyaryl polyisocyanates, trimers of polyisocyanates, polyisocyanates which are the reaction products of diisocyanates or triisocyanates with polyhydric alcohols and the like, and mixtures, trimers and isomers thereof.

The simplest class of useful polyisocyanates can be represented by the following general formula:

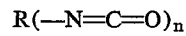

where R represent a radical of appropriate valence derived from a member of the class consisting of aliphatic hydrocarbons containing up to 8 carbon atoms, aromatic hydrocarbons containing up to 13 carbon atoms, alicyclic hydrocarbons containing up to 6 carbon atoms, and alkyl aryl substitutes thereof; and $n$ is an integer from 2–4. Typical trimers of the useful polyisocyanates can be illustrated by the following general formula:

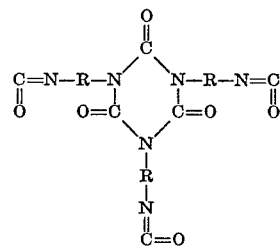

where R is the same as defined in the above formula for the polyisocyanates. Typical examples of the reaction products are polyisocyanates with polyhydric alcohols and can be illustrated by the following general formula:

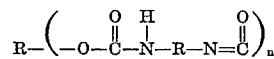

where R is the same as defined in the above formula for the polyisocyanates and $n$ is an integer from 2–10.

Suitable reactive hydrogen containing compounds combining with the polyisocyanates to form the desired polyurethanes include phenols such as phenol, cresols, xylenols, etc., alcohols, amides, enols and the like. Mixtures thereof can also be used. The preferred blocking agents are compounds with the hydroxyl group attached to the aromatic ring, i.e., phenols.

The preferred polyurethanes may be prepared by reacting the monohydric phenol with the reaction product of a polyhydric alcohol and an arylene diisocyanate. The polyhydric alcohols are in general preferably limited to compounds containing not more than 16 carbon atoms. For use in wire enamels, the polyhydric alcohols should contain preferably not more than 10 carbon atoms. Examples of these alcohols are ethylene glycol, propylene glycol, glycerol, a hexane triol (e.g., trimethylol propane) pentaerythritol, etc. The monohydric phenol may be an aryl compound such as phenol, cresols, xylenols and ethyl phenol. This class of preferred polyurethanes can be represented by the general formula:

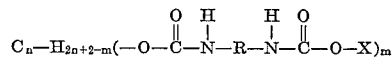

where R represents a member of the class consisting of phenylene, methyl phenylene, dimethyl phenylene, naphthylene and methyl naphthylene groups, X represents a member of the class consisting of phenyl and alkyl phenyl groups, said alkyl groups containing 1–6 carbon atoms, $m$ is an integer greater than 1 but not greater than $n$, and $n$ is an integer from 2–10.

One may use from 2 to 15 parts of the polyurethane resin in the practice of this invention. Preferably one would use from 7 to 9 parts with 8 parts as the optimum amount.

The silicone containing materials which are useful in the practice of this invention are those silanes and polysiloxanes which correspond to the following general formula:

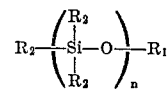

wherein $R_1$ is hydrogen, alkyl of from 1–4 carbon atoms, aryl of from 6–10 carbon atoms, $R_2$ is independently selected from the group consisting of hydroxyl, alkyl of from 2–10 carbon atoms, alkoxy of from 1–4 carbon atoms, and aryl of from 6–10 carbon atoms, $n$ is an integer of from one to 30.

Preferably one would use silanes and polysiloxanes corresponding to the above formula wherein $R_1$ is phenyl and $R_2$ is a mixture of alkoxy, aryl and alkyl radicals wherein the mole percent of aryl/alkyl varies from 10/90 to 90/10 and especially preferred are silanes and polysiloxanes wherein $R_2$ is a mixture of methoxy, phenyl and hexyl radicals.

The useful range of silicon containing materials is from 2 to 15 parts. Preferably one would use 4.5 to 7.5 parts with an optimum of 5.5 parts.

When used as a coating composition, the materials used in the practice of this invention should be dissolved in a substantially anhydrous organic solvent medium. Any non-reactive volatile mutual solvents for the resinous components may be used, such as substituted and unsubstituted aliphatic and aromatic solvent systems. For the coating of magnet wire, the solvent medium preferably contains a substantial amount of a phenol such as phenol, cresol, xylenol, and predominantly aromatic hydrocarbons such as xylene, naphtha and mixtures such as the high solvency petroleum hydrocarbons used in the examples. The particular naphtha hydrocarbon mixture in the preceding example of the preparation of the wire enamels is a mixture of aromatic liquid hydrocarbons of boiling range 150–184° C. derived from coal-tar and/or petroleum. The cresylic acid that was used is a mixture of liquid phenolic compounds consisting primarily of xylenols and cresols and having a boiling range of 195–227° C.

The wire enamels of the present invention are stable under usual storage conditions. Further, no initiator other than heat is required to accomplish the reactions of the resins. The reaction initiates at temperatures about 150° C. with the reaction proceeding more rapidly as the temperatures increase. In the commercial type wire towers generally employed for wire enameling, it is preferred to conduct the reaction at tower operating temperatures of approximately 300–450° C.

The resinous compositions of this invention form valuable insulative coatings both on magnet wires and in other applications such as for example, foil condensers. These coatings are smooth, glossy, tough, adhere well to metals, are resistant to solvents and abrasion and are superior to conventional wire enamels in burnout resistance.

It is to be understood that the present invention is not limited to the particular wire coating compositions, applications or wire sizes described above. It is obvious from the above test results that it is possible to utilize the present coating compositions as a base coat on a wire and to apply as an overcoat one or more of the many compatible insulating varnishes and thereby obtain a coating acceptable at even higher operating temperatures. It is also obvious that the present enamels may be applied as a varnish over a base coat of less thermally resistant and solvent resistant coatings. Nor is it intended to limit the application of the resinous composition as an electrical insulation for wire merely. It is possible therefore, by means of extrusion, dipping, casting and other known means to form insulation from such a mixture that is useful in such electrical applications as slot liners, encapsulation, sheet insulation, and surface coatings. The coating compositions disclosed can also be used as an adhesive or impregnating varnish for such articles as glass tapes and electrical coils. Other non-electrical uses of the compositions are apparent where chemical resistance and temperature stability of the final product are needed, such as surface coatings and others. It will be obvious to the man skilled in the art, therefore, that other compositions and applications are within the scope of this invention.

What is claimed is:
1. An improved wire enamel composition comprising (A) poly(vinyl formal) (B) from about 40 to about 70 parts of a formaldehyde/phenolic condensate (C) from about 2 to 15 parts of a blocked isocyanate (D) from about 2 to 15 parts of a melamine aldehyde resin and (E) from about 2 to 15 parts of a silicon containing material selected from the group consisting of silanes and polysiloxanes of the following general formula:

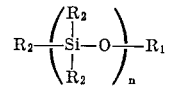

wherein $R_1$ is selected from the group consisting of hydrogen, alkyl of from 1 to 4 carbon atoms, aryl of from 6 to 10 carbon atoms, $R_2$ is independently selected from the group consisting of hydroxyl, alkyl of from 2 to 10 carbon atoms, alkoxy of from 1 to 4 carbon atoms, and aryl of from 6 to 10 carbon atoms, $n$ is an integer of from one to 30, and wherein the parts listed in (B) to (E) above are parts by weight per hundred parts by weight of poly(vinyl formal).

2. The improved wire enamel of claim 1 wherein the formaldehyde/phenolic condensate is a condensate of formaldehyde with a phenolic solution comprising from about 45 to about 65% m-cresol, from about 25 to 35% p-cresol and from 0 to 30% lower-boiling xylenols.

3. The improved wire enamel of claim 1 wherein the blocked isocyanate is the reaction product of a polyisocyanate and phenol.

4. The improved wire enamel of claim 1 wherein the melamine aldehyde resin is a melamine/aldehyde/alkanol/aryl sulfonamide condensate.

5. A process for the preparation of an improved wire enamel composition comprising (A) poly(vinyl formal) (B) from about 40 to about 70 parts of a formaldehyde/phenolic condensate (C) from about 2 to 15 parts of a blocked isocyanate (D) from about 2 to 15 parts of a melamine aldehyde resin and (E) from about 2 to 15 parts of a silicon containing material selected from the group consisting of silanes and polysiloxanes of the following general formula:

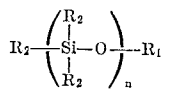

wherein $R_1$ is selected from the group consisting of hydrogen, alkyl of from 1 to 4 carbon atoms, aryl of from 6 to 10 carbon atoms, $R_2$ is independently selected from the group consisting of hydroxyl, alkyl of from 2 to 10 carbon atoms, alkoxy of from 1 to 4 carbon atoms, and aryl of from 6 to 10 carbon atoms, $n$ is an integer of from one to 30, and wherein the parts listed in (B) to (E) above are parts by weight per hundred parts by weight of poly (viny formal) wherein the said process comprises dissolving the resinous components in an organic solvent.

6. A process as in claim 5 wherein the formaldehyde/phenolic condensate is a condensate of formaldehyde with a phenolic solution comprising from about 45 to about 65% m-cresol, from about 25 to 35% p-cresol and from 0 to 30% lower boiling xylenols.

7. A process as in claim 5 wherein the blocked isocyanate is the reaction product of a polyisocyanate and phenol.

8. A process as in claim 5 wherein melamine aldehyde resin is a melamine/aldehyde/alkanol/aryl sulfonate condensate.

9. A process for insulating wire which comprises coating the wire with an organic solution comprising (A) poly (vinyl formal) (B) from about 40 to about 70 parts of a formaldehyde/phenolic condensate (C) from about 2 to 15 parts of a blocked isocyanate (D) from about 2 to 15 parts of a melamine aldehyde resin and(E) from about 2 to 15 parts of silicon containing material selected from the group consisting of silanes and polysiloxanes of the following general formula:

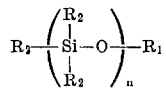

wherein $R_1$ is selected from the group consisting of hydrogen, alkyl of from 1 to 4 carbon atoms, aryl of from 6 to 10 carbon atoms, $R_2$ is independently selected from the group consisting of hydroxyl, alkyl of from 2 to 10 carbon atoms, and aryl of from 6 to 10 carbon atoms, $n$ is an integer of from one to 30, and wherein the parts listed in (B) and (E) above are parts by weight per hundred parts by weight of poly(vinyl formal); removing the solvent from the coating and curing the coating on the wire to a temperature of at least 150° C.

10. An electrical conductor insulated with an organic insulation comprising (A) poly(vinyl formal) (B) from about 40 to about 70 parts of a formaldehyde/phenolic condensate (C) from about 2 to 15 parts of a blocked isocyanate (D) from about 2 to 15 parts of a melamine aldehyde resin and (E) from about 2 to 15 parts of a silicon containing material selected from the group consisting of silanes and polysiloxanes of the following general formula:

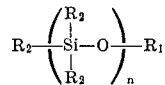

wherein $R_1$ is selected from the group consisting of hydrogen, alkyl of from 1 to 4 carbon atoms, aryl of from 6 to 10 carbon atoms, $R_2$ is independently selected from the group consisting of hydroxyl, alkyl of from 2 to 10 carbon atoms, alkoxy of from 1 to 4 carbon atoms and aryl of from 6 to 10 carbon atoms, $n$ is an integer of from one to 30, and wherein the parts listed in (B) to (E) above are parts by weight per hundred parts by weight of poly(vinyl formal).

References Cited

UNITED STATES PATENTS

| 2,307,588 | 1/1943 | Jackson | 260—844 |
| 2,506,320 | 5/1950 | Vail | 260—827 |
| 2,721,854 | 10/1955 | Kohl | 260—826 |
| 3,037,959 | 6/1962 | Lavin et al. | 260—856 |
| 3,068,189 | 12/1962 | Lavin et al. | 260—839 |
| 3,072,596 | 1/1963 | Lavin et al. | 260—839 |
| 3,104,236 | 9/1963 | Lavin et al. | 260—839 |

SAMUEL H. BLECH, Primary Examiner

PAUL LIEBERMAN, Assistant Examiner

U.S. Cl. X.R.

117—75, 128.4, 232; 260—33.4, 33.6, 827, 839